INVENTOR.
JORDAN H. STOVER, III

United States Patent Office 3,461,715
Patented Aug. 19, 1969

3,461,715
COMPRESSIVE FORCE MEASURING DEVICE
Jordan H. Stover III, Bloomfield Hills, Mich., assignor to Lebow Associates, Inc., Oak Park, Mich., a corporation of Michigan
Continuation-in-part of application Ser. No. 505,912, Nov. 1, 1965. This application Aug. 1, 1968, Ser. No. 769,768
Int. Cl. G01l 5/12
U.S. Cl. 73—141                 9 Claims

ABSTRACT OF THE DISCLOSURE

A device for measuring compressive force includes a thin force washer having a peripheral edge on which at least one strain gage is mounted, the washer also having top and bottom faces each provided with a flat outer annular portion and a countersunk or otherwise depressed inner annular portion. The washer has a thickness not less than about 0.15 inch but no greater than about 0.4D, its outer diameter being about 1.5D; and the inner diameter of each flat outer annular portion is from $D+0.025$ to $1.32D$ plus or minus 5%, where D is the washer's inner diameter in inches and corresponds closely to the nominal diameter of the bolt with which the washer may be used. Two additional washers may be located above the top face and below the bottom face, respectively, of the force washer, the upper washer being of larger outer diameter than the force washer, and both additional washers being of at least substantially the same hardness as the force washer.

---

This invention relates to a device for measuring compressive forces. It has particular reference to the measure of the force of compression between a bolt head and a piece of work. It may also be used to measure the compressive force between any two flat surfaces.

The present application is a continuation-in-part of my copending application Ser. No. 505,912 filed Nov. 1, 1965, now abandoned.

My invention is a compressive force measuring washer of a specific design which has one or more strain gages mounted on its periphery. The invention may be better understood by reference to the accompanying drawings in which.

Figure 3:
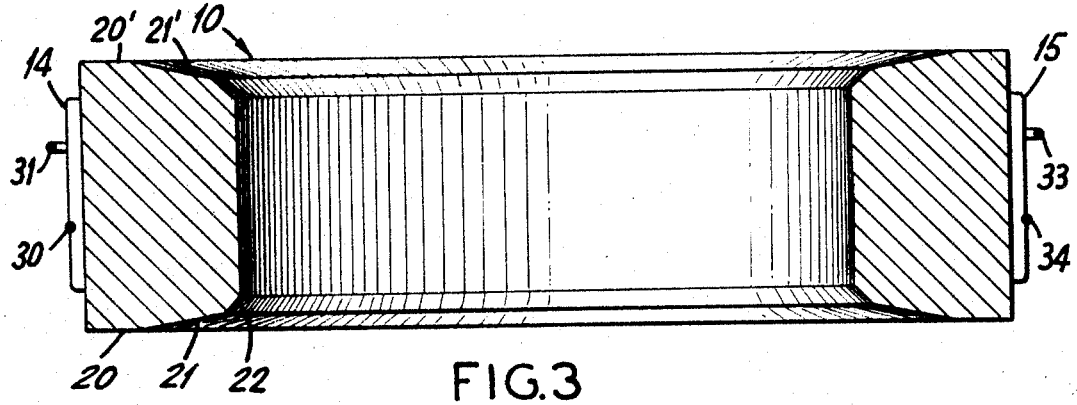
FIG. 3 is a cross-sectional view along line 3—3 in FIG. 2.

As shown in FIG. 3, the washer has a standard annular disc design but is countersunk over approximately two-thirds of its face area. Each of the flat portions 20 and 20′ of the washer is shown as constituting about 30 to 40% of the total horizontal cross-sectional area of the washer, but it may constitute as much as 60% or more. This special design causes compressive forces on the washer to be borne entirely by the opposite outer annular flat portions 20 and 20′ and therefore permits accurate measurement of the compressive strain on the washer by the strain gages mounted on the peripheral edge of the washer 10. This design also permits more accurate measurement of the compressive strain since, assuming a constant force, the strain is proportionally greater on the reduced area than for a completely flat washer.

When the compressive strain on the flat portion 20 has been measured as more fully hereinafter set forth, the proportional strain on a washer of the same size but completely flat may be determined by knowing the cross-sectional area of the washer in relation to the area of flat portion 20.

Figure 1:
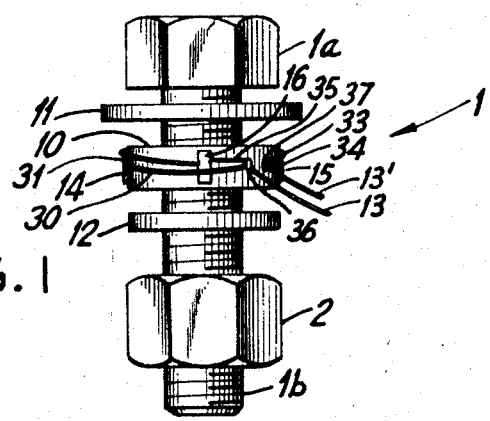
FIG. 1 is a side view of a nut and bolt combination including the force washer of my invention.

As shown in FIG. 1, the force washer 10 preferably is used with two additional washers 11 and 12, one above and one below the force washer 10. The washer 11 above the force washer is slightly larger in diameter, so as to protect the strain gages on the periphery of the force washer. The washer 12 below the force washer has about the same diameter as the force washer 10. The two washers 11 and 12 prevent the force washer from embedding into the nut or other metal below and are at least as hard as and preferably harder than the force washer, and reduced friction between them and the force washer thus permits measurement of the compressive strain on the force washer without frictional or other lateral restriction of the force washer.

The washers 11 and 12 also provide uniform bearing surfaces for the force washer irrespective of the material above or below them. This permits measurement of forces under identical conditions even though the characteristics of the metal on which the force washer ultimately bears may be different. For instance, if the force washer were bearing on aluminum, this material would permit a high degree of embedding and a different frictional characteristic than in the case of steel. Although the lower face of the lower hardened washer 12 may feel these differences, its upper face (on which the force washer bears) does not. The upper hardened washer 11 also serves these same purposes.

The inside diameter of the hole in the three washers is slightly larger than the maximum diameter of the threaded portion 1b or the body of the bolt 1 (FIG. 1). The outside diameter of the force washer 10 and the lower washer 12 is approximately equal to the width across flats of the bolt head or nut under which it is to be used so that the lower flat washer will present approximately the same bearing area to the work as the bolt head or nut would. The upper washer 11 is countersunk to the maximum dimensions of the fillet under the bolt head 1a under which it is to be used, so that the fillet under the bolt head will not have a tendency to spread the washer and possibly break it or interfere with the movement of the portion which bears on the force measuring washer.

The force measuring washer (in addition to having a hole slightly larger than the diameter of the bolt under which its use is intended and a major diameter equal to the width across flats of the bolt head or nut under which it is intended for use), has, as previously stated, a countersink on both faces, preferably at about a ten degree angle. Each of these countersinks (21 and 21′, FIG. 3) covers about two-thirds of the annular face area of the force washer 10. The countersinks are necessary, as stated, so that the major portion of the compressive force is carried by the two flat surfaces (20 and 20′, FIG. 3), thus subjecting the strain gages on the periphery of the washer to the major portion of the strain.

A decrease in the area of the ten degree countersink and a consequent increase of the flat area of the force washer permits higher loads to be measured without the possibility of exceeding the compressive yield strength of the force washer body material, so that loads up to the ultimate tensile strength of alloy steel heat-treated bolts can be measured. However, the force washer then becomes less accurate at 85% below its minimum capacity. On the other hand, low end accuracy can be improved and comparatively low loads more accurately measured by decreasing the Young's modulus of the material of the force washer body. For instance, aluminum has a Young's modulus of about one-third that of steel. Thus, by using aluminum as the material for the body of the force washer, and by using the normal configuration and similar temperature compensation, it possible to accurately measure loads two-thirds lower than loads which can be accurately measured with steel heat-treated force washers.

The minor diameter of the force washer has another countersink (22, FIG. 3), preferably of the order of 45°, so that it may be used without the two hardened flat washers. In such a case the countersink eliminates lateral forces from the fillet or radius under the bolt head and insures that the strain gages measure only true compressive forces.

As previously indicated, the flat annular bearing surfaces (20 and 20', FIG. 3) of the force washer are less in area than the cross-sectional area of the bolt head or nut under which it is intended to be used. For this reason, it is necessary to harden the force washer so that it can withstand the axial proof load of heat-treated SAE Grade 5 and Grade 8 bolts. If it is not heat treated, it will permanently deform under maximum bolt loads and will thus give false readings. It has been found that heat treatment to approximately 58 Rockwell C Scale has produced sufficient hardness to withstand the proof load of SAE Grade 8 bolts without exceeding the compressive yield strength of the force washer. For example, the proof load of an SAE Grade 8 bolt is 120,000 pounds per square inch. The heat treatment of a force washer made from stainless steel grade 440C, will produce a hardness of 58 Rockwell C Scale. At this hardness, this steel will have a yield strength which is equivalent to the compressive yield strength of approximately 275,000 p.s.i., which is sufficient to withstand a bolt load of 120,000 p.s.i. on an area reduced by 40%.

The flat washers (11 and 12, FIG. 1) used immediately above and below the force washer must be as hard as or slightly harder than the force washer so that the force washer will not embed or brinell into them and restrict the movement of the force washer. It is extremely important that the force washer's movement be unrestricted so that it can operate only in the compressive sense. The flat washers are of such a thickness that they can withstand compressive loads up to at least the proof load stress of SAE Grade 8 bolts without breaking or permanently deforming. In practice, this thickness has been found to be $3/64''$ for bolt diameters from $1/4''$ through $1/2''$, and $1/16''$ for bolt diameters from $9/16''$ through $3/4''$, and $5/65''$ thick for sizes $7/8''$ and $1''$. After the force washer and the two hardened flat washers have been made and hardened as before described, they should be ground or polished so as to produce a smooth, flat and uniform surface.

Figure 2:
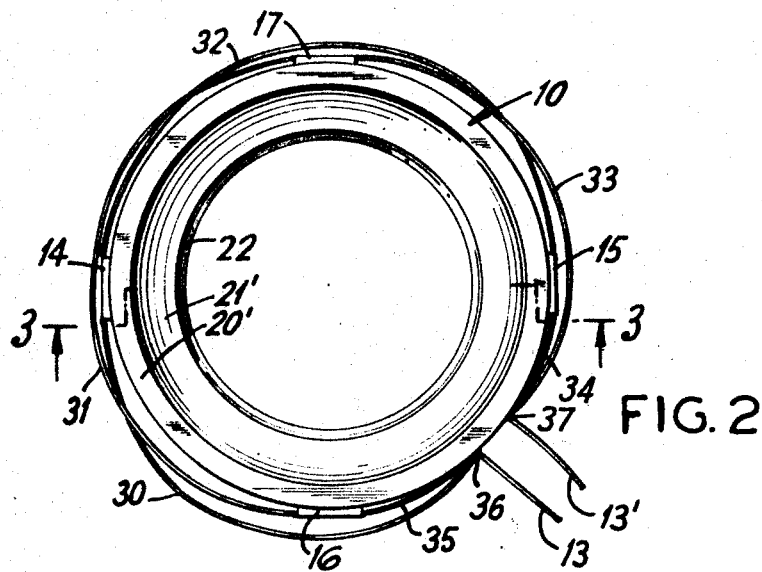
FIG. 2 is an enlarged top view of the force washer.

One or more strain gages, preferably of the foil type, are mounted vertically on the periphery of the force washer to measure the compressive strain. In FIG. 2, by way of example, four strain gages 14, 15, 16 and 17 are schematically shown mounted on the periphery of force washer 10. In order to reduce the effects of angular loading, it is desirable to mount as many equally spaced strain gages on the force washer as possible to measure the compressive strain. It has been found that four 120 ohm resistance strain gages mounted on a $1/4''$ washer, six on a $5/16''-7/16''$, and nine on a $1/2''-1''$ washer, work satisfactorily. The strain gages are mounted by first coating the smooth and cleaned exterior cylindrical surface of the washer 10 with a special adhesive, such as BR–600 which, after curing, will withstand approximately 300° F. or more without failure. The strain gages are then adhered to the force washer and the adhesive is cured and bonds the gages to the washer. The gages are then preferably wired in such a manner so as to give a total resistance of 120 ohms, since most commercially available equipment is standardized to read out that amount of resistance. The strain gages may then be included in the circuit of a Wheatstone bridge to measure the change in resistance due to the compressive force on the force washer. They may also be connected to any other conventional recording instrument or to a specially adapted recording instrument to measure such change and thus the compressive force on the washer. Assuming that four standard 120 ohm strain gages are used, they may be combined to give a total resistance of 120 ohms by connecting half in series with each other and the other half in series with each other and then connecting in parallel the two groups. For example, in FIG. 2, four strain gages are shown schematically mounted on the periphery of the force washer 10, the gages 14 and 15 are connected in series with each other as are gages 16 and 17, and each of the pairs 14–15 and 16–17 are then wired in parallel. Referring to FIG. 2, lead 32 connects gage 14 in series with gage 15 and lead 31 connects gage 16 in series with gage 17. Lead 34 from gage 15 and lead 33 from gage 17 connect the two pairs in parallel at point 37. Leads 30 and 35 complete the parallel wiring of the two pairs 14–15 and 16–17 by joinder at point 36. Connectors 13 and 13' lead from points 36 and 37, respectively, for connection with the recording equipment to measure the change in resistance in the gage or gages. When six gages are used on a larger washer, three of the gages, 120° apart, are wired in series as are the remaining three. The two groups of three gages are then wired in parallel which gives a total of 180 ohms which may then be reduced to 119 ohms by including an additional 350 ohm resistance in parallel with the two groups. When nine gages are used, three gages, 120° apart, are wired in series, another group of three gages, 120° apart, are wired in series, and the remaining group of three, 120° apart, are also wired in series. The three groups are then wired in parallel to produce 120 ohms of resistance. Thus, whether one or more strain gages are used, a standard 120 ohm resistance strain gage may be used and in each case the overall resistance remains approximately 120 ohms and may be used in conventional equipment which is adapted to read changes in strain in a circuit having about 120 ohms of resistance as a standard.

By having a number of strain gages around the periphery of force washer 10, an average of the compressive force on the washer is obtained rather than the force at any particular localized point on the washer.

It is desirable that foil strain gages be selected of the self-temperature compensated variety which are matched to the thermal expansion coefficient of the force washer material, so that the completed force washer will be uneffected by temperature changes. For example, stainless steel grade 440C has a coefficient of thermal expansion of $5.6 \times 10^{-6}$ p.p.m./° F., and it should be matched with a foil strain gage that has a corresponding compensation factor. It has further been found desirable to temperature compensate the lead wires from the force washer to the connector by using a three wire system, in which two of the lead wires are of equal length and are included in adjacent legs of a Wheatstone bridge circuit, and any effect of temperature on resistance is thus cancelled.

After the strain gages are bonded to the force washer, and wired as herein described, they are then given a protective coating of epoxy resin or rubber or other suitable material which will protect them from corrosion and short circuiting due to moisture or other elements. A two lead wire system (as shown by 13 and 13', FIGS. 1 and 2), or a three wire system as described above but not shown, is used so that the force washer may be connected to equipment to read the change in strain on the washer.

A feature of my invention in its preferred form resides in the shape and dimensions of the force washer. As shown in the drawing, the outer peripheral edge of the force washer 10 forms an annular vertical surface extending continuously from one to the other of the flat outer annular bearing surfaces 20 and 20' at the opposite faces of the washer. The diameter of this annular vertical surface (the outer diameter of the force washer) is shown as about 1.5D and should not be substantially in excess of that value, where D is the washer's inner diameter and is essentially the outer diameter of the threaded portion of the bolt which is to extend through the washer. The thickness of the force washer is at least about 0.15 inch but not greater than about 0.4D; and each of the countersinks 21 and 21' preferably has a maximum outer diameter (corresponding to the inner diameter of the flat annular outer surfaces 20 and 20') which is from $D+.025$ inch to 1.32D plus or minus 5%.

With this preferred construction, the performance of the new force washer can be appreciated by comparing it with a prior force washer disclosed in German provisional Patent No. 1,050,571 published Feb. 12, 1959. As shown in FIG. 1 of that provisional patent, the outer periphery of the force washer includes slanting surfaces to give the washer a barrel shape, the purpose ascribed to this shape being to prevent outward bulging of the peripheral portion under the compressive force applied to the washer, since such bulging was considered to preclude reliable force measurements by the strain gages on the washer. As a concomitant of this barrel shape, the thickness of the prior force washer is considerably greater than its inner diameter.

I have discovered that the barrel shape and relatively great thickness of this prior force washer are unnecessary to obtain accurate force measurements over a wide range of compressive forces. This has been demonstrated by actual force measurements with the latter washer and with my new force washer in its preferred form described above. The comparative measurements were made with a Skidmore-Wilhelm hydraulic bolt calibrator including a hydraulic pump for stressing the bolt and a pressure gage for indicating the bolt load. An Ellis Bridge Amplifier Meter (BAM), Model No. 3S, was used as the read-out instrument for the strain gages, of which nine were equally spaced around the periphery of the prior German washer and six were similarly spaced on my new washer. The German washer was scaled down to 1/5 of the dimensions shown in FIG. 1 of the provisional patent, so as to accept a 5/16 inch bolt, which was the bolt size used in the comparative tests.

Surprisingly, the tests showed that the new force washer provides force measurements at least as accurate as those provided by the prior German force washer over the entire range from 1000 to 7000 lbs. of load, the tests having been made with increments of 1000 lbs. The reason for this good performance of the new force washer is not entirely clear, although it appears that either my new washer is well adapted for preventing the bulging which the prior washer was designed to prevent, or whatever bulging occurs with the new washer does not impair its force measurements significantly.

I claim:

1. A device for use in apparatus for measuring a compressive force exerted between two opposing flat surfaces, which comprises a thin annular force washer having an outer peripheral edge and also having top and bottom faces each provided with an outer flat annular portion and an inner annular depressed portion, whereby said outer flat annular portion is adapted to bear said force, said peripheral edge forming an annular vertical surface extending continuously from one to the other of said flat annular portions, each depressed portion extending radially inward from the adjacent flat annular portion to the inner diameter of the washer, the thickness of the washer being at least about 0.15 inch but not greater than about 0.4D, where D is said inner diameter, and at least one strain gage mounted on said outer peripheral edge.

2. The device of claim 1, in which the outer diameter of the washer is about 1.5D.

3. The device of claim 1, in which said deprssed portions are at least partly formed by countersinks each having a maximum outer diameter, corresponding to the inner diameter of the adjacent outer flat annular portion, which is from D plus .025 inch to 1.32D plus or minus 5%.

4. The device of claim 1, in which the outer diameter of the force washer is about 1.5D, said depressed portions being at least partly formed by countersinks each having an outer diameter, corresponding to the inner diameter of the adjacent outer flat annular portion, which is from D plus .025 inch to 1.32D plus or minus 5%.

5. The device of claim 4, in which each said countersink is at about a ten degree angle to the adjacent outer flat annular portion.

6. The device of claim 1 suitable for measuring compressive force of a bolt upon a flat surface, and wherein said inner diameter of the force washer is slightly larger than the maximum diameter of the bolt, the outer diameter of the force washer being about equal to the width across flats of the bolt head.

7. A device for use in apparatus for measuring a compressive force exerted between two opposing flat surfaces, which comprises a thin annular force washer having an outer peripheral edge, a top face and a bottom face, wherein each face has an outer flat annular portion and an inner annular depressed portion, whereby said outer flat annular portion is adapted to bear said force, at least one strain gage mounted on the outer peripheral edge of the force washer, and two additional washers located one above the top face of the force washer and one below the bottom face of the force washer, said additional washers being at least as hard as the force washer.

8. The device of claim 7, wherein the top washer is larger in outer diameter than the force washer.

9. The device of claim 1, comprising also a first additional washer located above the top face of the force washer and substantially larger in outer diameter than the force washer, and a second additional washer located below the bottom face of the force washer, each said additional washer being at least as hard as the force washer and having a flat annular surface adapted to engage the entire area of the opposing flat annular surface of the force washer.

References Cited

UNITED STATES PATENTS

| | | |
|---|---|---|
| 3,088,083 | 4/1962 | Ward. |
| 3,124,770 | 3/1964 | Ciavatta. |
| 3,151,258 | 9/1964 | Sonderegger et al. |
| 3,199,057 | 8/1965 | Gindes et al. |

FOREIGN PATENTS

| | | |
|---|---|---|
| 790,057 | 2/1958 | Great Britain. |

OTHER REFERENCES

German printed application No. 1,050,571, published February 1959.

CHARLES A. RUEHL, Primary Examiner

U.S. Cl. X.R.

73—88.5; 85—62

PO-1050
(5/69)

UNITED STATES PATENT OFFICE
CERTIFICATE OF CORRECTION

Patent No. 3,461,715   Dated August 19, 1969

Inventor(s) Jordan H. Stover, III

It is certified that error appears in the above-identified patent and that said Letters Patent are hereby corrected as shown below:

Column 5, line 10, before "German" insert --West--.

SIGNED AND SEALED
NOV 17 1970

(SEAL)
Attest:

Edward M. Fletcher, Jr.
Attesting Officer

WILLIAM E. SCHUYLER, JR.
Commissioner of Patents